United States Patent Office 2,783,886
Patented Mar. 5, 1957

2,783,886

PROCESS OF BENEFICIATING ORES

Ira M. Le Baron, Evanston, Ill., assignor to International Minerals & Chemical Corporation, a corporation of New York No Drawing. Application October 28, 1953, Serial No. 388,921

26 Claims. (Cl. 209—211)

The present invention relates to the process of beneficiating or concentrating ores. More particularly, the process of the present invention relates to the beneficiating or concentrating of phosphatic ores, or phosphorus-containing materials. In general, the process of the present invention is applicable to beneficiation of any nonsilicate, nonmetallic ores such as, for example, apatite, fluorapatite, sylvite, langbeinite, fluorspar, and the like.

Apatite and fluorapatite, which are the crude phosphatic materials or minerals, occur widely in nature and are generally thought to be chiefly tricalcium phosphate coupled with other minerals such as quartz, silicates, calcium carbonate, and the like, all of which, of course, contain no phosphorus and are of little, if any, nutritive value so far as plants and animals are directly concerned. Such materials, in addition, contain traces or minor quantities of heavy metals, heavy metal salts and oxides, such as ferric oxide, aluminum oxide, and the like. Many methods have been devised in the past for treating such ores to effect beneficiation or concentration of the phosphatic constituents of apatite, fluorapatite, and the like, while removing therefrom the siliceous, carbonaceous and heavy metal constituents therefrom. Several methods involve the desliming, dewatering and separation of either pulped or unpulped material in order to effect this beneficiation and concentration. One commonly used method involves the reagentizing of such a dewatered ore with a relatively high boiling hydrocarbon oil or liquid together with the use of a basic component such as caustic. When an aqueous suspension of pulped phosphatic rock is reagentized with a composition containing this combination, and the same agitated and aerated in an aqueous suspension, the phosphatic values and components of the rock are found to rise and become segregated in the upper portion of such suspension while the siliceous values are found to settle or deposit in the lower portion of such a suspension. The beneficiated or enriched phosphatic material is withdrawn and further treated by reflotation for further beneficiating of the phosphatic ore and the material so segregated is either subjected to acid treatment for the production of superphosphate, or is ground and sold as raw enriched phosphate rock having from 60% to 75%, and even as high as 80% of tricalcium phosphate computed as bone phosphate of lime.

In such a process, however, particularly in the case of tabling operations and flotation operations, large quantities of power are consumed for the mechanical operation for the machines involved. Also, the space factor for a multiplicity of units necessitates large buildings to house the same, all of which increase the cost of capital investment and the basic investment per ton of ore concentrated.

It is an object of the present invention to provide an improved process of concentrating or beneficiating phosphatic ores.

It is a further object of the present invention to provide an improved process of concentrating or beneficiating nonmetallic ores.

It is a further object of the present invention to provide an improved process for concentrating or beneficiating nonsilicate, nonmetallic ores in which a marked reduction in power and consumption and in housing facilities is effectuated.

It is a further object of the present invention to provide a segregation or beneficiation of phosphatic ores in which less capital investment per ton of ore concentrated is achieved.

Still further objects of the invention will be apparent upon a more complete understanding of the invention as hereinafter more fully described.

The present invention is directed to the discovery of and use of an improved separation or beneficiation process for nonmetallic ores. For example, if a phosphatic ore such as Florida pebble phosphate rock is sized and deslimed, it is then dewatered to a solids content of between about 60% and about 80%, and treated and agitated with a reagentizing material or composition. This material is generally made up of three components which are as follows:

A. A collector which may also act as a frothing agent.
B. An extender.
C. A pH regulator.

The extender may at times be dispensed with if desired, though generally in commercial operations an extender is used. The collector may be a material such as tall oil, petroleum sulphonates, napthenic acids, long chain fatty acids or the soap derivatives thereof, and the like. The extender employed may be in liquid hydrocarbon or mixture of hydrocarbon such as fuel oil, diesel oil, kerosene, and the like. For a pH regulator in general, any inorganic basic compound may be used, though it is preferable to use caustic soda, soda ash, potassium hydroxide, and the like. This composition is added to the dewatered, deslimed ore, in amounts ranging between about one-half to two pounds per ton of feed for the collector, between about one to four pounds per ton of feed of the extender, and between about one-half to one and one-half pounds per ton of the pH regulator or caustic. After this material is thoroughly mixed, it is diluted with water to give a slurry or pulp having between about 20% and about 40% solids, preferably between about 25% and about 30% solids, and is then fed conventionally to a froth flotation or tabling operation.

Flotation procedures are applicable to potash ores found in the vicinity of Carlsbad, New Mexico, such as sylvinite, langbeinite, etc., as well as to mixed salts obtained from brine deposits such as are found in the vicinity of Bonneville, Utah. Sylvinite ore, for example is mined from geological strata containing the same and the ore subjected to a preliminary crushing or grinding operation, thereby obtaining a material of −5 mesh size. The crushing operation liberates substantially all of the sylvite or potassium chloride. This crushed ore is then pulped with water saturated with respect to sylvinite, and the pulp reagentized as a high solids pulp which contains about 40% to about 80% by weight of suspended solids.

Reagents for the flotation separation of potash ore constituents may be those having a selective affinity for sodium chloride, such as fatty acids or derivatives of fatty acids, i. e., coconut oil soap, palm kernel oil soap, also red oil, alkali resinate and the like or those having selective affinity for sylvite such as the straight chain aliphatic amines containing at least one alkyl group having 7 to 18 carbon atoms. Particularly useful flotation reagents for this operation are, for example, aliphatic amines, such as normal heptylamine, n-dodecylamine, n-heptadecylamine, and the like. The higher members of the aliphatic series of amines, for example, those which contain from 16 to 18 carbon atoms, are much less soluble in the sylvinite pulp and are more conveniently employed in the form of their water-soluble acid addition salts. For example, a mixture of aliphatic amines comprising about 25% by weight of hexadecylamine and about 75% by weight of octadecylamine are particularly useful for conducting flotation operations herein described when employed in the form of their acetic acid addition salts. Other acids which may be employed to form salts of the amine reagents are sulfuric acid, hydrochloric acid, phosphoric acid, etc. The amount of cationic or amine flotation reagent necessary for flotation operations is of the order of about 0.2 pound to about 1.0 pound of reagent per ton of flotation feed. After the sylvinite ore pulp is conditioned with the reagents, the pulp is diluted to a solids concentration in the range of about 20% to about 40%, and the resultant mixture subjected to a froth flotation from which the sylvite particles are recovered in the float, while the halite particles are concentrated in the tailings. In such an operation the need reagents which cooperate with the flotation reagents, such as fuel oil, pine oil, etc., is obviated.

In the instant invention, however, the pulped and reagentized feeds are processed through a novel treatment; namely, the pulp is delivered in slurry form and the slurry allowed to proceed by gravity in a downward spiralling path. The spiral pathway through which this feed is processed is formed by means of a trough constructed of any suitable material such as wood, metal or plastic, and although no specific number of turns to the spiral nor the slope of the trough is required, it has been found that a suitable spiral pathway has the following dimensions: a spiral trough 6 feet high having five turns in the spiral. The outside diameter of the curvature of the spiral was about 24 inches, while the inside diameter of this curvature was about 6.25 inches. The slope of the spiral represents a drop of about 3 inches per foot. While the trough is more or less semicircular in shape, the bottom thereof is slightly flattened. It is not necessary, however, that this shape be maintained in order to give operable results.

In each turn of the spiral there may be one or more drawoffs or ports, with the exception of the first turn. These drawoffs or ports are positioned according to the fraction which it is desired to bleed off from each turn of the trough. For example, in the separation of silica from phosphate, the silica tends gradually to accumulate and to move in a path approaching the inner edge of the spiral. In the separation of sylvite from halite utilizing a reagent having selective affinity for sylvite such as amines, the halite tends gradually to accumulate and to move in a path approaching the inner edge of the spiral. The drawoffs therefore are displaced from the center line of the flattened bottom portion of the troughs and so positioned that generally at least a portion of one component of an ore moving in the flow path will automatically fall into the drawoff.

By way of further explanation, the slurry of ore and water courses through the trough and the siliceous bodies and impurities, for example, effect a gradual but substantial segregation. In phosphate separations the silica moving in water as a slurry flows a path of shortest diameter and the substantially nonagglomerated phosphate particles plus water move as slurry tending to move in its downward flow to the outside or large diameter wall of the trough. At the drawoffs a predominantly silica-water slurry is withdrawn as a tailing. At the lowest end of the spiral a predominantly phosphate-water slurry is recovered to give a beneficiated ore. In its travel through the spiral the solids are travelling in a stream of relatively shallow depth. Phosphate ore apparently rides in the water and shows substantially no agglomeration or clustering together of the particles. The silica likewise can be observed to be moving as individual particles. The phosphate slurry in its flow through the spiral acquires somewhat greater velocity than the silica. This velocity difference between ore components is dependent upon the factors of ore type, volume throughout, size of the spiral trough as governed by the outside diameter, and slope of the spiral. For a 24 inch diameter trough spiral with 3 inch slope at a throughput in the range of one to five tons of phosphate ore solids per hour, the water velocity at the end of the fifth turn of a 6 feet high spiral is many times the velocity of water flow on a table and this helps to maintain the ore in a substantially nonagglomerated condition.

A spiral actually constructed and used had three drawoffs per turn, except the first turn. The beneficiated ore is delivered from the last turn of the spiral and is either subjected to further beneficiating treatment by other processes or it may be further beneficiated by refeeding the concentrate to the same or another spiral. Likewise, the tails or tailings which are removed from the drawoff ports in the spiral may be subjected to further treatment either by flotation, tabling or spiralling to recover by further processing any phosphatic values remaining therein.

As a further embodiment of the invention, it has been discovered that separations may also be attained by inclusion of one or more riffles attached to the inner surface of the spiral trough. These elements may be of any desired height from the floor of the trough, but in general, good results are attained using a riffle having a height of between about 1/16 inch and about 1/4 inch. They are so positioned in the bottom of the trough that the tails or siliceous body are conducted or directed to a drawoff port. In other words, the position of the riffle is obliquely positioned to the path of flow of the pulp so as to direct the siliceous material to the drawoff port, the phosphatic material continuing on over the riffle relatively unaffected. In the specific runs, shown in Table B as hereinafter outlined, two such riffles 1/8 inch high were employed. It is contemplated, however, that the invention may be practiced while employing any given number of riffles depending, of course, upon the amount of siliceous bodies to be removed from the particular ore being processed.

The material once finally concentrated to the desired B. P. L. (bone phosphate of lime) content may be utilized in a conventional manner such as for the production of superphosphate, ground phosphate of lime, or in general fertilizer production. It is desirable, however, in general, to treat the concentrate with a mineral acid such as sulfuric or hydrochloric acid in order to remove any traces of reagentized composition which may be adhering to the concentrate particles.

In order to afford a fuller understanding of the invention, but not in any way to be limited thereby, the following examples are given:

TABLE A

| Example | Feed, B. P. L., wt. percent | Spiral concentrate, B. P. L., wt. percent | Spiral Tails, B. P. L., wt. percent | Table concentrate, B. P. L., wt. percent | Table tails, B. P. L., wt. percent |
| --- | --- | --- | --- | --- | --- |
| 1 | 54.67 | 75.07 | 8.17 | | |
| 2 | 54.14 | 77.69 | 7.24 | 76.77 | 14.29 |
| 3 | 50.41 | 77.04 | 7.74 | 75.98 | 14.47 |
| 4 | 49.95 | 76.19 | 8.18 | 76.08 | 11.16 |

The above percentages given under the last two columns represent analyses of concentrate and tails from a conventional agglomerate tabling beneficiation operation wherein the feed was identical with that fed to the spiral treatment. Also, the ore going to the tabling operation was deslimed, dewatered, reagentized and slurried in identical manner to that of the feed going to the spiral operations. It will be noticed that the concentrate grade is slightly higher and that there is considerable improvement in the recovery of phosphatic materials in the case of the spiral operation as contrasted with the conventional agglomerate tabling operation.

In still a second series of runs, the same feed prepared for beneficiation in the same way as in Examples 1, 2, 3 and 4 was fed through the same spiral at the same rate of flow or throughput except that the floor of the spiral trough had attached thereto two riffles positioned so as to collect and conduct the siliceous bodies toward a tailings discharge port. The following examples illustrate the improved beneficiation by following this novel expedient.

TABLE B

| Example | Feed, B. P. L., wt. percent | Spiral concentrate, B. P. L., wt. percent | Spiral Tails, B. P. L., wt. percent | Table concentrate, B. P. L., wt. percent | Table tails, B. P. L., wt. percent |
|---|---|---|---|---|---|
| 5 | 49.65 | 77.39 | 2.71 | 73.68 | 8.87 |
| 6 | 54.14 | 77.69 | 7.24 | 76.77 | 14.29 |

As in the case of the data reported in Table A, the last two columns are given in order to show a comparison between the conventional agglomerate tabling operation and the novel spiral process. Prior to treating and processing the respective feeds to the table and to the spiral, the feeds are identical as in the case of the feeds employed in Table A. Not only is the B. P. L. content of the concentrate obtained from the spiral (as shown in Table B) improved over that obtained in the conventional tabling operation, but the spiral concentrate obtained as shown in Table B is of improved B. P. L. content over that of the spiral concentrate shown in the examples of Table A, the difference between the two sets of data being due to the use of riffles in Examples 5 and 6.

In all of the foregoing examples the ore was prepared for spiral treating as follows: Florida pebble phosphate rock naturally sizing as follows: a relatively small amount of +14 mesh, and a relatively small amount of −200 mesh, the bulk of the rock being between those two sizes is deslimed, dewatered and reagentized with a composition of the following components in the following amounts: about 0.75 pound per ton tall oil, about 4.0 pounds per ton mixture of fuel oil and kerosene, and about 0.8 pounds per ton NaOH. The reagentized material is then diluted to about 30% solids with water and at the rate of about two tons of solids per hour feed into the top of a spiral trough about 6 feet high, having five turns in the sprial, the outside diameter of the curvature of the spiral being about 24 inches and the inside diameter of the curvature of the spiral being about 6.25 inches. The slope of the spiral trough represents a drop of about 3 inches per foot. The trough is more or less semicircular in shape. At intervals along the bottom of the spiral, the siliceous tailing are drawn off. These drawoffs are spaced about three per turn of the spiral, except the first turn. The beneficiated ore product is delivered from the last turn of the spiral.

*Example 7*

After removal of +1 millimeter Florida phosphate pebble material from a slurry of matrix dug at the mine, the remaining slurry was deslimed in accordance with known procedures. The underflow from the hydroseparator desliming operation contained about 40% solids. This slurry was classified and screened to produce a fraction the bulk of which particles had a mesh size in the range of −14 +35 with about 35% of the fraction being particles in the range of −35 +200. The −35 mesh fraction was sent to the flotation section for beneficiation. The −14 +35 mesh fraction analyzed approximately 49% B. P. I. To this −14 +35 mesh fraction was added 1 pound of tallow amine acetate (Armac T) and 40 pounds of No. 2 fuel oil per ton of dry solids. The mixture was agitated thoroughly to disperse the reagents through the slurry. The reagentized material was fed as an approximately 30% solids content slurry at the rate of one-half ton of dry solids per hour to a 6 foot high, 5 turn Humphreys spiral having a 24 inch diameter trough with a 3 inch slope. The spiral used had 3 drawoffs per turn except the first turn.

When the ore is reagentized with tallow amine acetate, the beneficiated ore is removed through the drawoff ports and the silica tail is delivered from the last turn of the spiral. Results were as follows when using a single stage of Humphreys spiral and processing.

TABLE C

| | Feed, B. P. L., percent | Spiral drawoff concentrate, B. P. L., percent | Tail, B. P. L., percent |
|---|---|---|---|
| Run A | 49 | 67.2 | 42.6 |
| Run B | 49 | 60.3 | 34 |

The above percentages given under the various columns represent analyses of results on a product which initially was comparable to the feed material of Example 5. While the data shows that tall oil reagentizing is more effective in sprials than amine acetate reagentizing, nevertheless the data shows that in a multistage amine acetate reagentized spiral operation beneficiation will be effective to make a commercial grade phosphate concentrate.

*Example 8*

Sylvinite ore of the type common to the Carlsbad, New Mexico, area and analyzing about 22% $K_2O$ was ground to a point where mesh analysis showed the comminuted ore to have a size in the range between about 6 mesh and about 35 mesh. The ground material was suspended in a saturated solution of sylvinite ore at about 24° C., the resultant pulp containing about 75% by weight of suspended solids. To this pulp was added approximately 3 pounds of amine reagent [tallow amine acetate (Armac TD)] and about 4 pounds of fuel oil per ton of feed. The resultant mixture was agitated for about 30 seconds. This conditioned pulp was diluted with saturated brine to approximately 22% solids content. The dilute pulp was delivered as a slurry at the rate of approximately one-half ton of dry solids per hour to a 6 foot high 5 turn Humphreys spiral having a 24 inch diameter trough with a 3 inch slope.

The ore reagentized with tallow amine acetate separated into two slurry streams with halite tail material being removed through the drawoff ports and the beneficiated sylvite material being delivered from the last turn of the spiral.

Results were as follows when using a single stage of Humphreys spiral and processing.

TABLE D

| Feed, percent $K_2O$ | Concentrate, percent $K_2O$ | Tail, percent $K_2O$ |
|---|---|---|
| 22 | 40.9 | 1.5 |

The present application is a continuing application of application United States Serial Number 362,384, filed June 17, 1953, now abandoned, which application was a continuing application of United States Serial Number 233,684, filed June 26, 1951, now abandoned, which application in turn was a continuation-in-part application of application United States Serial Number 718,601, filed December 26, 1946, and now abandoned.

Having thus fully described and illustrated the character of the invention, what is desired to be secured and claimed by Letters Patent is:

1. A process of concentrating nonmetallic, nonsilicate ore susceptible to beneficiation by froth flotation from gangue material contained therein, which comprises admixing an aqueous pulp of sized and slurried ore with a reagent having selective affinity for one of the components of said ore, diluting the conditioned pulp with additional fluid to obtain a freely flowing pulp, flowing said pulp by gravity as a stream in a spiral path at a rate of flow at least sufficient to avoid any substantial amount of agglomeration of particles, and collecting a concentrate portion from the spiralled stream as a slurry.

2. A process of concentrating phosphate ore from the silica contained therein, which comprises admixing an aqueous pulp of said ore with a reagent having a selective affinity for one of the components of said ore, beneficiating said ore by gravity-flowing a stream of said aqueous pulp in a spiral path, at a rate of flow at least sufficient to avoid any substantial amount of agglomeration of particles, and collecting a concentrate portion from the spiralled stream.

3. A process of concentrating sylvinite ore which comprises admixing an aqueous pulp of said ore with a reagent having selective affinity for one of the components of said sylvinite ore, diluting the conditioned pulp with additional fluid saturated as to sylvinite ore, beneficiating said ore by gravity-flowing a stream of said aqueous pulp in a spiral path, at a rate of flow at least sufficient to avoid any substantial amount of agglomeration of particles, and collecting a concentrate portion from the spiralled stream.

4. A process of concentrating phosphate minerals from their silica-containing ores, which comprises admixing an aqueous pulp of said ore with a reagent having a selective affinity for one of the components of said ore, diluting the conditioned pulp with additional water to obtain a freely flowing pulp, flowing said pulp by gravity as a stream in a spiral path while in contact with a solid, slightly concave surface at a flow rate at least sufficient to avoid any substantial amount of agglomeration of particles and collecting a phosphate concentrate portion from the spiralled stream as a slurry.

5. A process of concentration as in claim 4 wherein Florida phosphate ore sized between about 14 and about 200 mesh is employed.

6. A process of concentrating phosphate minerals from the Florida pebble phosphate washer debris, which comprises desliming said material, conditioning a high-density aqueous pulp of said deslimed ore with a fatty acid collector for phosphate, a petroleum oil and an organic basic compound, diluting the conditioned pulp with additional water to obtain a freely flowing pulp, flowing said pulp by gravity as a stream in a spiral path while in contact with a solid, slightly concave surface at a flow rate at least sufficiently great to avoid any substantial amount of agglomeration of the phosphate particles, and separately collecting a phosphate concentrate as a slurry from the outer portion of the spiralled stream.

7. A process as in claim 6 wherein at least one silica tailings portion per turn of the spiral path, except the first turn, is withdrawn from the spiralled stream.

8. A process as in claim 6 wherein at least one silica tailings portion is withdrawn from the spiralling stream, and wherein the feed is Florida phosphate ore sized between about 14 and about 200 mesh.

9. A process as in claim 6 wherein the fatty acid collector is tall oil and the inorganic basic compound is caustic soda, and wherein the diluted, conditioned pulp contains between about 20 percent and about 40 per cent by weight of solids, the ore particle mesh size ranging between about 14 and about 200 mesh.

10. A process of concentrating phosphate minerals from Florida pebble phosphate washer debris which comprises desliming said material, conditioning a high density aqueous pulp of said deslimed material with an amine acetate collector for silica and a petroleum oil, diluting the conditioned pulp with additional water to obtain a freely flowing pulp, flowing said pulp by gravity as a stream in a spiral path while in contact with a solid, slightly concave surface at a flow rate at least sufficiently great to avoid any substantial amount of agglomeration of the reagentized particles, and separately collecting a phosphate concentrate from the inner portion of the spiralled stream.

11. A process of concentrating phosphate minerals from the Florida pebble phosphate washer debris, which comprises admixing an aqueous pulp of said ore with a reagent having a selective affinity for one of the components of said ore, diluting the conditioned pulp with additional water to obtain a freely flowing pulp, flowing said pulp by gravity as a stream while in contact with a solid, slightly concave surface at a flow rate at least sufficiently great to avoid any substantial amount of agglomeration of the phosphate particles in a spiral path having about five turns per six feet in height, withdrawing silica tailings as a portion of the spiralling stream at least once in each turn of the spiral pathway, except the first turn, and separately collecting a phosphate concentrate as a slurry from a portion of the spiralled stream.

12. A process of concentrating sylvinite ore which comprises admixing an aqueous pulp of said ore with an amine reagent having selective affinity for sylvite, diluting the conditioned pulp with additional saturated brine solution to obtain a freely flowing pulp, flowing said pulp by gravity as a stream while in contact with a solid, slightly concave surface at a flow rate at least sufficiently great to avoid any substantial amount of agglomeration of the sylvite particles in a spiral path having about 5 turns per 6 feet in height, withdrawing halite tailings as a portion of the spiralling stream at least once in each turn of the spiral pathway except the first turn, and separately collecting a sylvite concentrate as a slurry from the outer portion of the spiralled stream.

13. A process of concentrating phosphate minerals from the Florida pebble phosphate washer debris, which comprises desliming said ores, conditioning an aqueous pulp of high density of said deslimed ore with a fatty acid collector for phosphate, a petroleum oil and caustic soda, diluting the conditioned pulp with sufficient water to obtain a final pulp containing between about 20 percent and about 40 percent by weight of solids, flowing said pulp by gravity and as a stream while in contact with a solid, slightly concave surface at a flow rate at least sufficiently great to avoid any substantial amount of agglomeration of the phosphate particles in a spiral path having about five turns per six feet in height, withdrawing silica tailings as a portion of the spiralling stream at least once in each turn of the spiral pathway, except the first turn, and separately collecting a phosphate concentrate as a slurry from the outer portion of the spiralled stream.

14. In a process of beneficiating Florida pebble phosphate washer debris involving reagentizing an aqueous pulp of said ore fraction with a collector having a selective affinity for one of the components of said ore fraction and recovering a phosphate concentrate from the reagentized aqueous pulp, the improvement comprising flowing the reagentized aqueous pulp as a gravity-flowing stream in a spiral launder having a slightly concave cross section at a flow rate at least sufficiently great to avoid any substantial amount of agglomeration of the phosphate particles, and collecting a phosphate concentrate as a slurry from a portion of the spiralled stream.

15. In a process of beneficiating Florida pebble phosphate washer debris involving reagentizing an aqueous pulp of said ore fraction with a collector selective to the phosphate particles and recovering a phosphate concentrate from the reagentized pulp, the improvement comprising flowing the reagentized aqueous pulp as a gravity-flowing stream in a spiral launder having a slightly concave cross section at a rate of flow sufficient to avoid any substantial amount of agglomeration of phosphate particles, withdrawing siliceous gangue from the inner portion of the spiralling stream, and collecting a phosphate concentrate portion of the spiralled stream as a slurry.

16. In a process of beneficiating Florida pebble phosphate washer debris involving reagentizing an aqueous pulp of said ore fraction with a collector selective to the phosphate particles and recovering a phosphate concentrate from the reagentized pulp, the improvement comprising preparing a reagentized aqueous pulp, the particle size range of which is about that conventionally fed to an agglomerate tabling operation, flowing the reagentized aqueous pulp as a gravity-flowing stream in a spiral launder having a slightly concave cross section at a rate of flow sufficient to avoid any substantial amount of agglomeration of phosphate particles, withdrawing siliceous gangue from the inner portion of the spiralling stream, and collecting a phosphate concentrate portion of the spiralled stream as a slurry.

17. In a process of beneficiating Florida pebble phosphate washer debris involving desliming said ore fraction, conditioning a high-density aqueous pulp of said deslimed ore fraction with a fatty-acid collector for phosphate, a petroleum oil and an inorganic basic compound, diluting the conditioned pulp with additional water to obtain a freely flowing pulp and recovering a phosphate concentrate therefrom, the improvement comprising flowing said reagentized diluted aqueous pulp as a gravity-flowing stream in a spiral launder having a slightly concave cross section at a rate of flow sufficient to avoid any substantial amount of agglomeration of phosphate particles, and collecting a phosphate concentrate from the outer portion of the spiralled stream as a slurry.

18. In a process of beneficiating Florida pebble phosphate washer debris involving desliming said ore fraction, conditioning a high-density aqueous pulp of said deslimed ore fraction with a fatty-acid collector for phosphate, a petroleum oil and an inorganic basic compound, diluting the conditioned pulp with additional water to obtain a freely flowing pulp and recovering a phosphate concentrate therefrom, the improvement comprising flowing said reagentized diluted aqueous pulp as a gravity-flowing stream in a spiral launder having a slightly concave cross section at a rate of flow sufficient to avoid any substantial amount of agglomeration of phosphate particles, withdrawing siliceous gangue from the inner portion of the spiralling stream, and collecting the phosphate concentrate portion of the spiralled stream as a slurry.

19. In a process of beneficiating Florida pebble phosphate washer debris involving desliming said ore fraction, conditioning a high-density aqueous pulp of said deslimed ore fraction with a fatty-acid collector for phosphate, a petroleum oil and an inorganic basic compound, diluting the conditioned pulp with additional water to obtain a freely flowing pulp and recovering a phosphate concentrate therefrom, the improvement comprising flowing said reagentized diluted aqueous pulp, the particle-size range of which is about that conventionally fed to an agglomerate tabling operation as a gravity-flowing stream in a spiral launder having a slightly concave cross section at a rate of flow sufficient to avoid any substantial amount of agglomeration of phosphate particles, withdrawing siliceous gangue from the inner portion of the spiralling stream, and collecting the phosphate concentrate portion of the spiralled stream.

20. A process as in claim 19 wherein the spiralled pulp contains between about 20 percent and about 40 percent by weight of solids.

21. In a process of beneficiating Florida pebble phosphate washer debris involving desliming said ore fraction, reagentizing and conditioning a high density aqueous pulp of said deslimed ore fraction with tall oil, fuel oil and caustic soda, diluting the conditioned pulp with additional water to obtain about 30 percent by weight of solids, and recovering a phosphate concentrate therefrom, the improvement comprising flowing said reagentized diluted aqueous pulp as a gravity-flowing stream at a rate of about two tons of solids per hour to a spiral launder having a slightly concave cross section, said launder being about six feet high and having about five turns, the outside diameter of the curvature of the spiral being about 24 inches and the inside diameter about 6.25 inches with the launder having a drop of about three inches per foot, and collecting a phosphate concentrate portion of the spiralled stream as a slurry.

22. In a process of beneficiating Florida pebble phosphate washer debris involving desliming said ore fraction, conditioning a high-density aqueous pulp of said deslimed ore fraction with tall oil, fuel oil and caustic soda, diluting the conditioned pulp with additional water to about 30 percent by weight of solids, and recovering a phosphate concentrate therefrom, the improvement comprising flowing said reagentized diluted aqueous pulp as a gravity-flowing stream at a rate of about two tons of solids per hour to a spiral launder having a slightly concave cross section, said launder being about six feet high and having about five turns, the outside diameter of the curvature of the spiral being about 24 inches and the inside diameter about 6.25 inches with the launder having a drop of about three inches per foot, and wherein the siliceous gangue is withdrawn from more than one turn of the spiral, except the first turn, and collecting the phosphate concentrate portion of the spiralled stream as a slurry.

23. A process of beneficiating mixtures comprising predominantly solid phosphate particles and silica particles which comprises admixing an aqueous slurry of said mixture with a reagent having selective affinity for one of the components of said mixture, diluting the conditioned slurry with additional water to obtain a freely flowing slurry, flowing said freely flowing slurry by gravity as a stream in a spiral path at a rate of flow at least sufficient to avoid any substantial amount of agglomeration of particles and collecting a phosphate concentrate from the spiral stream as a slurry.

24. A process of concentrating phosphate material from mixtures comprising predominantly solid phosphate particles and silica particles which comprises conditioning a high density aqueous slurry of said mixture with a collector selective to the phosphate particles, diluting the conditioned slurry with additional water to obtain a freely flowing slurry, flowing said diluted slurry by gravity as a stream in a spiral path while in contact with a solid slightly concave surface at a flow rate at least sufficiently great to avoid any substantial amount of agglomeration of the phosphate particles and separately collecting a phosphate concentrate as a slurry from the outer portion of the spiraled stream.

25. A process of concentrating phosphate material from mixtures comprising predominantly solid phosphate particles and waste material containing silica particles which comprises conditioning a high density aqueous slurry of said mixture with a collector selective to the phosphate particles, diluting the conditioned slurry with additional water to obtain a freely flowing slurry, flowing said diluted slurry by gravity as a stream in a spiral path while in contact with a solid slightly concave surface at a flow rate at least sufficiently great to avoid any substantial amount of agglomeration of the phosphate particles, withdrawing the waste material containing silica particles from the inner portion of the spiralling stream and separately collecting a phosphate concentrate as a slurry from the outer portion of the spiralled stream.

26. The process of claim 25 in which the collector selective to phosphate comprises a fatty acid soap.

(References on following page)

References Cited in the file of this patent

UNITED STATES PATENTS

| | | | |
|---|---|---|---|
| 629,595 | Pardee | July 25, | 1899 |
| 1,420,139 | Peck | June 20, | 1922 |
| 1,968,008 | Chapman | July 24, | 1934 |
| 1,973,439 | Mason | Sept. 11, | 1934 |
| 1,986,816 | Hasselstrom | Jan. 8, | 1935 |
| 1,995,603 | Cunningham | Mar. 26, | 1935 |
| 2,012,567 | Kerns | Aug. 27, | 1935 |
| 2,101,572 | Broatch | Dec. 7, | 1937 |
| 2,126,292 | Tartaron | Aug. 9, | 1938 |
| 2,231,066 | Greene | Feb. 11, | 1941 |
| 2,267,496 | Ellis | Dec. 23, | 1941 |
| 2,356,648 | Brusset | Aug. 22, | 1944 |
| 2,382,178 | Schilling | Aug. 14, | 1945 |
| 2,422,203 | McNeill | June 17, | 1947 |
| 2,431,560 | Humphreys | Nov. 25, | 1947 |
| 2,615,572 | Hodge | Oct. 28, | 1952 |

OTHER REFERENCES

U. S. Bureau of Mines Reports of Investigations RI 3271, February 1935, 13 pages. (Copy in Scientific Library.)

Taggart: "Handbook of Mineral Dressing," Sec. 12, page 13.

A. I. M.M. E., T. P. 2016 in Mining Technology for May 1946, 8 pages.